United States Patent [19]

Lütke

[11] Patent Number: 4,762,220

[45] Date of Patent: Aug. 9, 1988

[54] SIDE SCRAPER FOR A HEAP OF LOOSE MATERIAL

[75] Inventor: Hubert Lütke, Beckum, Fed. Rep. of Germany

[73] Assignee: Krupp Polysius AG, Beckum, Fed. Rep. of Germany

[21] Appl. No.: 384

[22] Filed: Jan. 5, 1987

[30] Foreign Application Priority Data

Jan. 27, 1986 [DE] Fed. Rep. of Germany ....... 3602360

[51] Int. Cl.$^4$ .............................................. B65G 65/06
[52] U.S. Cl. .................................... 198/519; 198/520; 414/133
[58] Field of Search ............... 198/509, 516, 518, 519, 198/520, 521, 522, 671; 414/133, 144, 145

[56] References Cited

U.S. PATENT DOCUMENTS

| | | | |
|---|---|---|---|
| 2,867,046 | 1/1959 | Baer | 198/509 X |
| 3,487,910 | 1/1970 | Strocker et al. | 198/519 X |
| 4,248,337 | 2/1981 | Zimmer | 198/520 X |
| 4,369,877 | 1/1983 | Heuer et al. | 198/520 X |
| 4,516,898 | 5/1985 | Cantenot | 198/520 X |

Primary Examiner—Robert J. Spar
Assistant Examiner—Lyle Kimms
Attorney, Agent, or Firm—Learman & McCulloch

[57] ABSTRACT

The invention relates to a side scraper which serves for the discharge of loose material from a heap of loose material and in which the free space between the surface of the heap to be cleared and the upper face of the scraper scoops is covered by a support element. In this way the mound of material which forms in the lower region of the heap on the cutting side of the scraper conveyor in the known constructions is avoided.

7 Claims, 3 Drawing Sheets

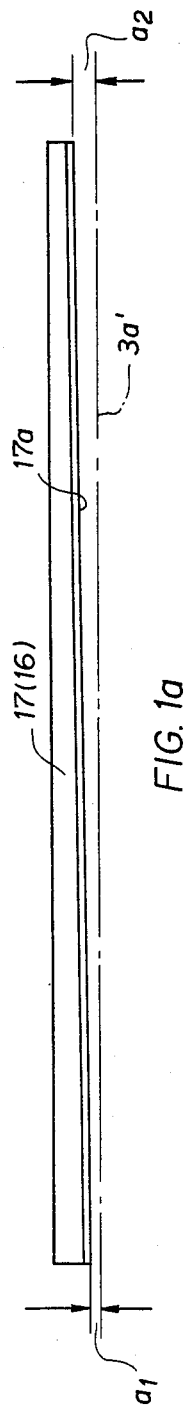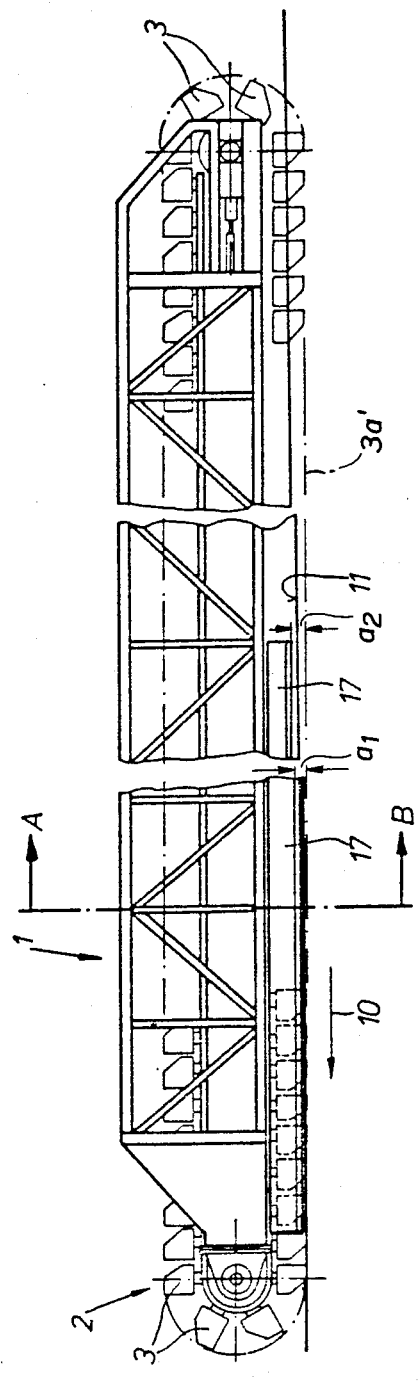
FIG. 1a
FIG. 1

SIDE SCRAPER FOR A HEAP OF LOOSE MATERIAL

The invention relates to a side scraper for the discharge of material from a heap of loose material.

BACKGROUND OF THE INVENTION

Side scrapers of the type with which this invention is involved overlie the inclined surface of an elongate heap of loose material and are movable transversely of a heap for the purpose of discharge of loose material from the heap by taking down the heap from its top surface. The material is discharged from the top of the heap to the foot of the heap as the scraper scoops are lowered into the surface of the heap to a specific depth and convey the loose material from the top of the heap to the bottom and at the same time the scraper arm is moved in the longitudinal direction of the heap.

In order that the scraper scoops can always be lowered into the surface of the heap to a specific depth as the discharge of material progresses, the scraper arm is pivotable in the region of the foot of the heap about an axis which runs parallel to the longitudinal direction of the heap. This results in the cutting depth of the scraper scoops being greatest at the top of the heap and zero at the bottom. Thus the cleared loose material has a cross-sectional profile of an elongated triangle. As a result certain problems relating to the discharge of loose material occur in the lower region of the scraper arm.

In the upper region of the heap, where the scraper scoops penetrate relatively deep into the loose material, a high material bed into which the scraper scoops cut is located on the side of the scraper arm which faces in the direction of movement (based upon the movement of the scraper arm in the longitudinal direction of the heap). This material bed forms the support for the scraper scoops which is necessary so that within the scraper scoops the loose material taken up by the scoops moves in the transverse direction of the scoops from the outer side which is to the fore when viewed in the direction of movement (in the longitudinal direction of the heap) to the opposite side.

On the other hand the situation in the lower region of the heap of loose material is different. Because the scraper scoops here dig less deeply into the surface of the heap, the support which is necessary for the cross-transport of the loose material in the scoop builds up in the form of a mound or ridge of loose material on the cutting side of the scraper scoops (i.e. on the outer side of the scraper arm which is to the fore in the longitudinal direction of the heap). The dimensions of this mound of loose material are proportional to the discharge capacity. The specific gravity of the loose material has an influence. The lower the density of the loose material is, the greater are the dimensions of the mound of material.

The considerable friction which occurs between this essentially stationary mound of material and the revolving scraper conveyor leads to a considerable energy loss and severe wear on the moving parts of the side scraper.

SUMMARY OF THE INVENTION

The object of the invention, therefore, is to construct a side scraper in which the free space between the surface of the heap to be cleared and the upper face of the scraper scoops is covered by a support element in such a way that the build-up of a mound of material on the cutting side of the scraper conveyor in the lower region of the heap of loose material is avoided.

THE DRAWINGS

One embodiment of the invention is illustrated in the drawings, in which:

FIG. 1 shows a side view of a side scraper according to the invention,

DETAILED DESCRIPTION

Figure 2:
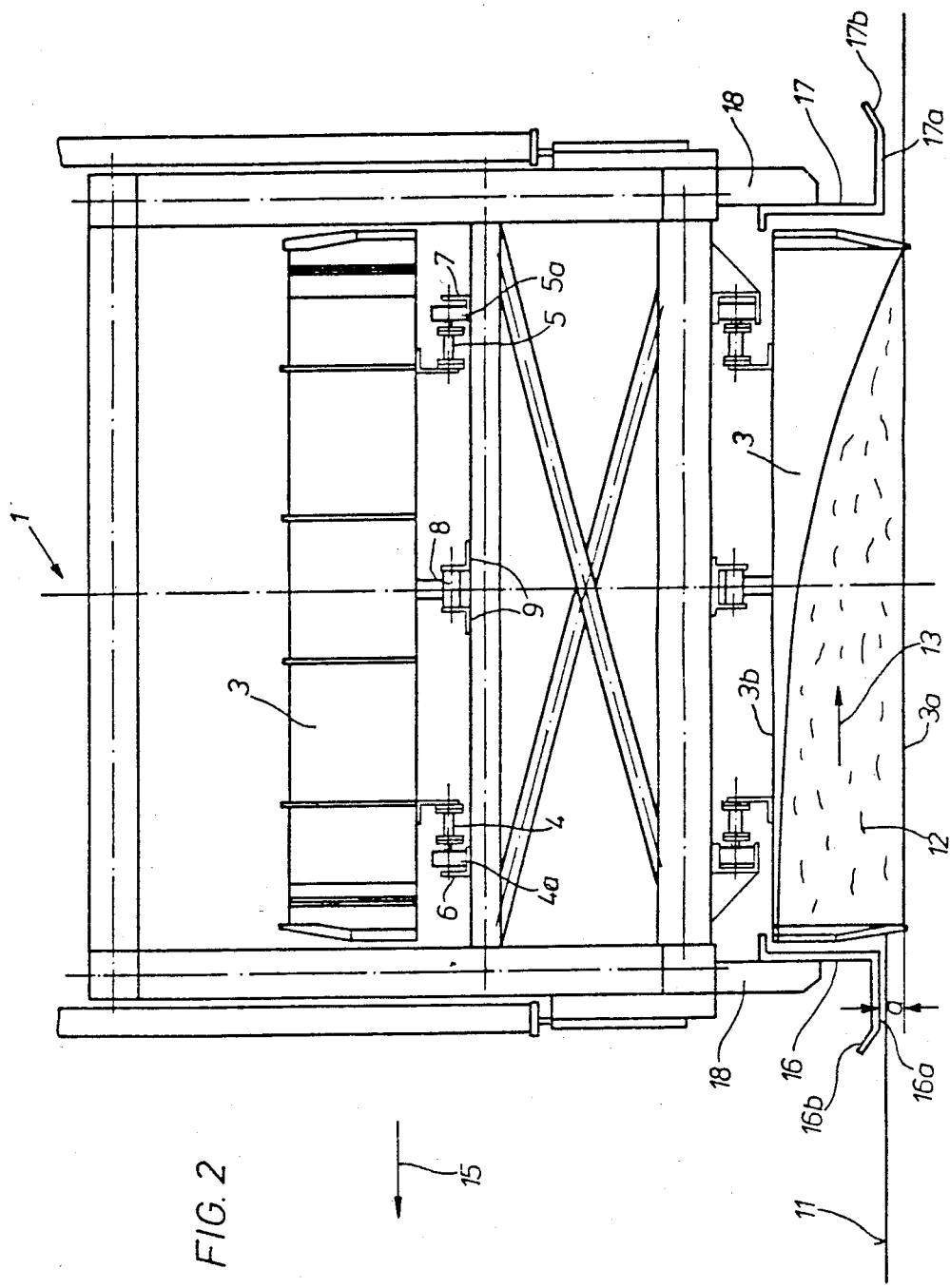
FIG. 2 shows a section along the line A-B of FIG. 1.

The side scraper according to the invention for the discharge of material from a heap of loose material which is illustrated in FIGS. 1 and 2 contains a scraper arm 1 which in the region of the foot of the heap (the lefthand end of the scraper arm 1) is pivotable about an axis which runs parallel to the longitudinal direction of the heap.

The scraper arm 1 carries a scraper conveyor 2 which contains a plurality of scraper scoops which move round continuously in the longitudinal direction of the scraper arm 1.

The scraper scoops are connected by two roller chains 4, 5 the rollers 4a, 5a of which run on guide rails 1. Rollers 8 which run in guide rails 9 serve to secure the scraper scoops against lateral forces.

The scraper conveyor 2 moves round in the direction of the arrow 10 and is driven by a drive means arranged in the region of the foot of the heap.

Figure 3:
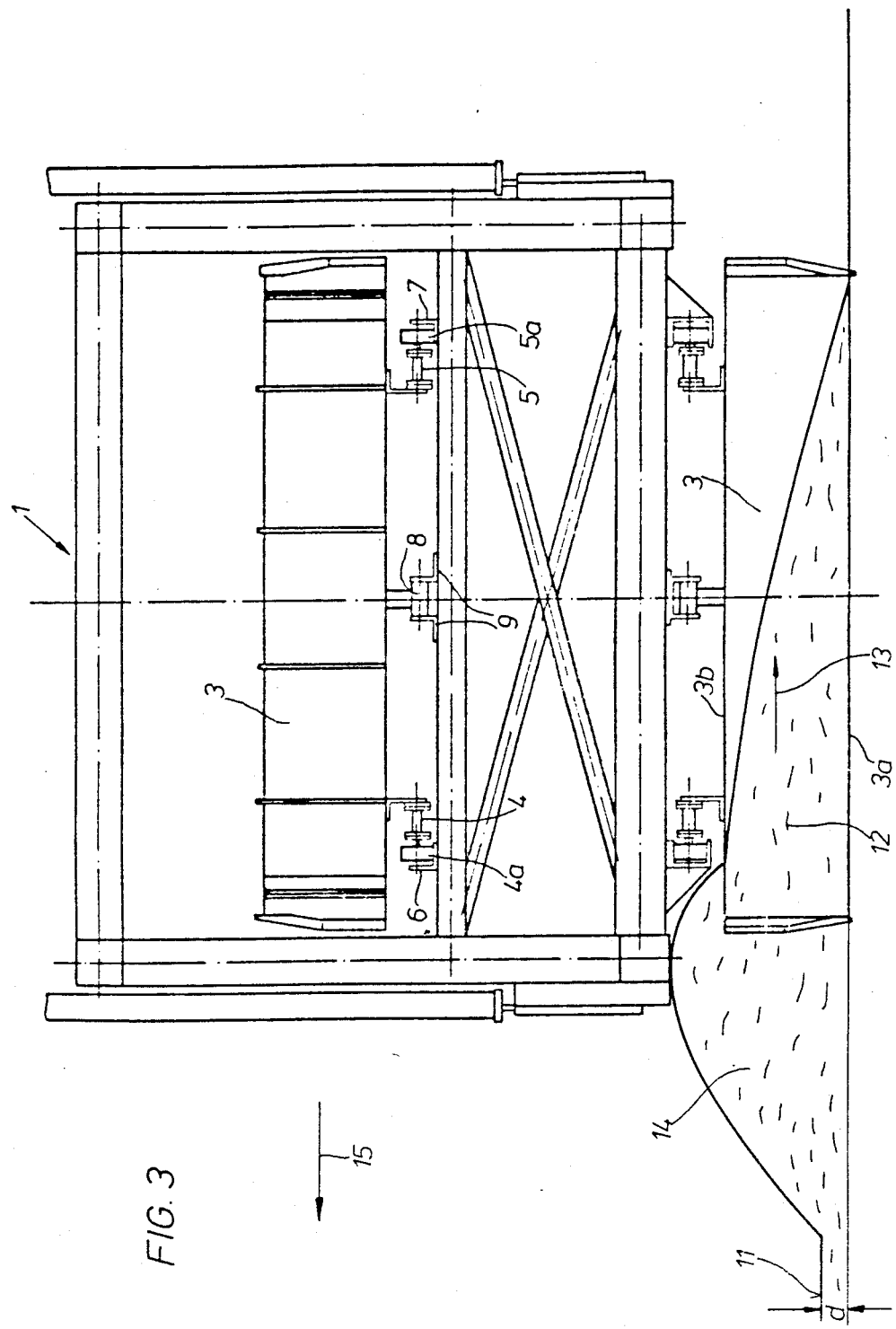
FIG. 3 shows a section (corresponding to FIG. 2) through a known side scraper without the support elements provided according to the invention.

Before discussion of the structural details of the side scraper which are essential to the invention, FIG. 3 will first of all be used as a basis for explanation of the conditions which prevail in the lower part of the heap of loose material during operation of the side scraper when the support elements according to the invention are not provided.

As already explained above, the scraper scoops 3 dig less deeply into the surface of the heap in the lower region of the heap of loose material (near the foot of the heap). In FIG. 3 the depth of penetration of the scoops 3, i.e. the distance between the lower edge 3a of the scraper scoops 3 and the surface 11 of the heap of loose material, is designated by d.

Since the force which effects the cross-transport of the loose material 12 contained in the scraper scoop 3 in the direction of the arrow 13 requires a support which cannot deliver the low material bed (of depth d) in the lower region of the heap of loose material, a mound or ridge of material 14 which rises significantly above the scraper scoops 3 forms on the cutting side of the scraper conveyor 2 (i.e. on the outer side of the scraper conveyor which is to the fore during movement in the longitudinal direction of the heap). The direction of movement of the scraper arm 1 in the longitudinal direction of the heap is characterised by the arrow 15 in FIG. 3.

It is clear that considerable friction occurs between this essentially stationary mound of material 14 and the scraper scoops 3, resulting in energy losses and severe wear.

In the side scraper according to the invention (as shown in FIGS. 1 and 2), in order to avoid the disadvantage described above the free space between the surface of the heap 11 to be cleared and the upper edge 3b of the scraper scoops 3 is covered at least on the outer side of the scraper arm 1 which faces in the longitudinal direction of the heap (15), but in the illustrated embodiment on both outer sides, is covered in the lower part of the scraper arm 1 facing the foot of the heap by a support element 16, 17 which is mounted on the scraper arm 1 by angles 18.

As can be seen from FIGS. 1 and 2, the distance a between the level of the lower edge 3a of the scraper scoops 3, which penerates the heap of material, and the level of the edge 16a or 17a of the support elements 16, 17 lessens towards the foot of the heap corresponding to the equally reducing depth of penetration of the scraper scoops 3 into the loose material.

The support elements 16, 17 extend—starting from the lower end of the scraper arm 1 (left-hand end according to FIG. 1) facing the foot of the heap—at least over half the length of the scraper arm.

The support elements 16, 17 have an L-shaped cross-section. The support element 16 which also faces in the direction of clearing (arrow 15) lies with its horizontally extending flange (lower edge 16a) on the surface 11 of the slope to be cleared. The horizontally extending flange of the support elements 16, 17 is provided with an upwardly bent outer edge 16b, 17b.

In the construction according to the invention the support element 16 (FIG. 2) to a certain extent replaces the mound of material 14 (FIG. 3) and provides the necessary support for the force which in the scraper scoop 3 effects the cross-transport of the loose material 12 in the direction of the arrow 13. The support element 16 covers the part of the height of the scraper scoops 3 which is located above the surface of the heap 11 (in the direction of clearing, arrow 15, lying before the scraper arm 1). The loose material can now move only between the support element 16 and the scraper scoop 3, which significantly reduces friction and wear.

What is claimed is:

1. A side scraper for use with an elongate heap of loose material having an inclined upper surface sloping upwardly of said heap from its foot to its top, said side scraper comprising a scraper arm mounted to extend upwardly from adjacent the foot of said heap towards its top and being movable in at least one direction longitudinally of said heap; conveyor means carried by said arm and including scraper means having an edge at such level with respect to said surface of said material as to penetrate the surface of said material; and support means carried by said arm on that side of said arm which faces in said direction, said support means having a lower surface at a level above that of said edge for engagement with said surface of said material to limit the extent of penetration of said scraper means into said material.

2. The side scraper according to claim 1 wherein said scraper arm may be positioned at such an angle to said surface that the depth of penetration of said scraper means into said material lessens toward the foot of said heap.

3. The side scraper according to claim 1 including second support means corresponding to the first-mentioned support means carried by said arm at its opposite side.

4. The side scraper according to claim 1 wherein said support means is of such length from its lower end as to extend over at least half the length of said arm.

5. The side scraper according to claim 1 wherein said support means is substantially L-shaped in cross-section and has at its lower end a flange which extends transversely of said arm to overlie said surface of said material.

6. The side scraper according to claim 5 wherein said flange has an upwardly inclined free end.

7. The side scraper according to claim 5 wherein said support means has a second flange upstanding from the first-mentioned flange and being closely adjacent said arm.

* * * * *